United States Patent [19]
Wilkes

[11] Patent Number: 5,539,817
[45] Date of Patent: Jul. 23, 1996

[54] WIDE AREA CENTREX TOLL SERVICE WITH NOVEL TRANSLATION

[75] Inventor: Douglas B. Wilkes, Orleans, Canada

[73] Assignee: Stentor Resource Centre, Inc., Ottawa, Canada

[21] Appl. No.: 570,326

[22] Filed: Dec. 11, 1995

[51] Int. Cl.[6] .............................. H04M 7/00; H04M 3/42; H04Q 11/04
[52] U.S. Cl. .......................... 379/230; 379/207; 379/220; 379/222; 379/224; 370/60.1
[58] Field of Search .................................. 370/60.1, 94.1, 370/110.1; 379/202, 207, 210, 211, 212, 215, 216, 219, 220, 221, 222, 224, 229, 230

[56] References Cited

U.S. PATENT DOCUMENTS

| | | | |
|---|---|---|---|
| 4,565,903 | 1/1986 | Riley | 379/220 |
| 5,247,571 | 9/1993 | Kay et al. | 379/207 |
| 5,253,288 | 10/1993 | Frey et al. | 379/201 X |
| 5,422,941 | 6/1995 | Hasenaur et al. | 379/207 |

Primary Examiner—Jeffery Hofsass
Assistant Examiner—Harry S. Hong
Attorney, Agent, or Firm—Cobrin, Gittes & Samuel

[57] ABSTRACT

A method of providing multi-switch business group (MBG) services at each of a plurality of locations is described. The MBG services can be provided for calls made from a calling party served by an originating switch at one location to a called party served by a terminating switch at a location serviced by an inter-exchange carrier (IEC). When the calling party goes off-hook, a determination is made of whether the call is made from a centrex line. Digits dialed by the calling party are then collected at the originating switch. A determination is then made of whether the dialed digits contain an access code indicative that the call is to be routed to one of the plurality of locations which is served by an IEC. If the call is to be routed via an IEC, the initial address message (IAM) required for IEC calls, is modified to include MBG service information. This will permit MBG services to be offered between the calling party and the called party over public CCS7 trunks routed via an IEC.

15 Claims, 7 Drawing Sheets

PRIOR ART

PRIOR ART

WIDE AREA CENTREX TOLL SERVICE WITH NOVEL TRANSLATION

BACKGROUND OF THE INVENTION

The present invention relates to methods and systems for providing a wide area centrex toll service, but more particularly, to a wide area centrex toll service which makes use of a switch-based multi-switch business group architecture.

In a basic wide area centrex service, a group of telephone lines are provided with business features which are similar to those provided by a PBX or a PABX. These features are provided through a central office exchange of the public telephone network but without the customer having to purchase and maintain a private exchange.

For example, wide area centrex provides intercom capabilities to the lines of a specified business group so that a business customer can dial other stations within the same group using extension numbers, such as a two, three or four-digit number, instead of the full telephone number associated with each called line or station. Improvements in centrex services and area wide centrex are disclosed in U.S. Pat. Nos. 5,247,571 and 5,422,941.

In order to provide wide area centrex services to customers who have locations which are normally connected via toll lines, a multi-switch business group (MBG) service can be offered to meet the needs of those customers. These customers will often be served by multiple switches in the same local access and transport area (LATA). Organizations such as banks, real estate firms, health care systems, school systems and governmental agencies will often demand centrex services deployed across each of their locations even though they may be served by a toll line.

MBG allows centrex and private network traffic to be placed on public CCS7 facilities while retaining customer group identity. When an MBG call is routed over a public CCS7 trunk, the identity of the customer group is sent to the destination switch. This allows a switch to identify calls among members of the same customer group and handle them differently than other calls. MBG extends many centrex services across the CCS7 network, supporting features such as network name and number display, reason display, etc.

Businesses that have multiple locations within a LATA but who cannot cost-justify private lines can use MBG to cost-effectively network those locations. Businesses now using a private line network can use MBG as an additional option for routing traffic and expanding their network to locations not served by private lines.

Generally, the customer is interested in forming a seamless communication network in terms of feature operation, and dialing patterns. It also would like its network to be transparent to calling clients and customers, with calls easily covered, routed and transferred throughout their network as though they were at a single location.

However, for multi-LATA businesses, many centralized hubs are linked into a multiple-hub arrangement. Multiple-hub operations have one or more relatively large locations, for example, main offices in more than one city. This means multiple points of concentration for the network access and support services. Often, multiple-hub customers are inter-LATA, and require the services of one or more inter-exchange carriers (IECs). Although the wide area centrex and MBG services might be offered by one carrier, customers with multiple hubs may wish to use a different carrier for long distance or toll traffic. Unfortunately, MBG service providers are unable to provide this service to customers having locations served by an IEC, since MBG service was never meant to be offered to inter-LATA locations.

The customer's ability to select an inter-LATA or toll carrier is made possible by a Regulation called equal access (EA). Equal access is an operating company tariff which provides a given subscriber access that is equal in type and quality to every inter-LATA carrier. Each IED has a dialing arrangement, call-screening technique, routing procedure, billing record, and signalling protocol are required to implement the EA environment.

The EA concept originated in the United States with the modified final judgment (MFJ) of 1982 in which AT&T lost its long-distance monopoly and was also required to divest itself of the Bell operating companies (BOCs). This divestiture action resulted in the formation of seven regional holding companies, each comprised of a number of the original BOCs. Manufacturers have implemented the EA concept according to the regulatory requirements of the 1982 MFJ. The United States EA concept is built on the geo-politically defined local access and transport areas (LATAs). A LATA is a fixed non-overlapping geographic area determined at the time of the MFJ ruling. Telecommunication services within a LATA, including local and toll calls within a LATA, are carried by Bell operating companies. Inter-LATA traffic must be carried by an inter-LATA carrier (IC). Today, intra-LATA competition is now allowed in the United States. That is, subscribers have the capability of selecting an alternate intra-LATA carrier for intra-LATA calls as well as an inter-LATA carrier for inter-LATA calls. The BOC must transfer inter-LATA traffic to the IC directly from the end office (EO) or via an intermediate switch called an access tandem (AT). The physical location of an IC within a LATA is referred to as the point of presence (POP).

In order to enable MBG basic call service, certain access in routing restrictions are assigned by the customer to individual lines using line privileges. For example, an MBG identifier is used to uniquely identify an MBG in the network. A customer's line belongs to one and only one MBG. A sub-group identifier uniquely identifies a group of lines within an MBG. If an MBG has sub-groups, an MBG line belongs to one and only one sub-group within an MBG. Line privileges (LP) specify the line privileges associated with an MBG line. Certain feature operation decisions are based upon line privileges.

In order to enable multi-switch business group services, certain information about the calling customer must be sent on the CCS7 signalling link between two switches serving the business group customer. This information is usually carried via the multi-business group MBG and generic address parameters in the ISUP message sent between SS7 capable switches.

However, it is not presently possible to populate the ISUP message with the necessary parameters which are required to support services which require multi-business group and generic address parameters to be transported for both intra-LATA and inter-LATA calls. That is on toll lines which may belong or be used by different inter-exchange carriers.

Accordingly, a need exists for a wide area centrex toll service which makes use of a multi-switch business group switch-based architecture which is capable of providing MBG services over locations served by various inter-exchange carrier facilities.

SUMMARY OF THE INVENTION

It is therefore an object of the present invention to provide multi-switch business group services in a wide area centrex toll service, wherein one or more location is served by an inter-exchange carrier.

Another object of the present invention is to provide wide area centrex toll service which is supported over public toll and inter-exchange carrier facilities via multi-business group and generic address parameters of ISUP messages.

Yet another object of the present invention is to provide a wide area centrex toll service which can be used over an existing public switched network (PSTN), dedicated access lines, switched access service, and inter-exchange carrier ISUP-based services, without altering the existing billing on these services.

Yet another object of the present invention is to provide a wide area centrex toll service which can provide centrex feature networking services over public toll and inter-exchange carrier facilities by inserting the ISUP parameter used to support equal access service into the initial address message of a wide area centrex toll call.

Yet another object of the present invention is to provide a wide area centrex toll service which enables centrex feature networking services over public toll and inter-exchange carrier facilities by providing the multi-business group (MBG) parameter, generic address parameter (GAP) and the Transit Network Selector (TNS) parameters into the ISUP initial address message carried over the SS7 signalling link.

Accordingly, it is an aspect of the present invention to provide in a telephone network having a plurality of locations served by switching offices with access to public CCS7 signalling facilities, a method of providing multi-switch business group (MBG) services at each of said plurality of locations, such that MBG services can be provided for calls made from a calling party served by an originating switch at one location to a called party served by a terminating switch at a location serviced by an inter-exchange carrier (IEC), comprising the steps of:

a) determining, when said calling party goes off-hook, whether the call is made from a centrex line;

b) collecting at said originating switch, digits dialed by said calling party;

c) determining whether the dialed digits contain an access code indicative that the call is to be routed to one of said plurality of locations served by an IEC; and d) if the call is to be routed via an IEC, modifying an initial address message (IAM) required for IEC calls, to include MBG service information, such that MBG services can be offered between the calling party and the called party over public CCS7 trunks routed via an IEC.

DESCRIPTION OF THE PREFERRED EMBODIMENT

In order to lighten the following description, the following acronyms will be used:
AIN: Advanced Intelligent Network;
CCS7: Common Channel Signalling 7;
CIC: Circuit Identification Code;
CIP: Carrier Identification Parameter;
CLID: Calling Line Identification;
ClgPn: Calling Party Number;
DN: Directory Number;
DTMF: Dual Tone Multi-Frequency;
GAP: Generic Address Parameter;
Initial Address Message;
IEC: Inter-Exchange Carrier;
ISDN: Integrated Services Digital Network;
ISUP: ISDN User Part;
LATA: Local Access Transport Area;
MBG: Multi-switch Business Group;
OLI: Originating Line Information;
PIC: Primary Interexchange Carrier;
PSTN: Public Switching Telephone Network;
SCP: Signalling Control Point;
SS7: Signalling System 7;
STP: Signalling Transfer Point;
TCAP: Transaction Capabilities Application Part;
TNS: Transit Network Selector.

A typical SS7 network consists of signalling links and nodes. SS7 nodes are referred to as signalling points (SP) and are interconnected by signalling links. Each SS7 signalling node is assigned a unique point code, serving as the network address for message routing. SS7 signalling nodes include signalling points (SP), service switching points (SSP), service control points (SCP) and signal transfer points (STP).

Signalling points (SP) are capable of sending and receiving SS7 messages with other SS7-equipped telephone offices, and routing calls based on the information exchanged. Incoming messages are formatted and transferred to the relevant processing function in the switch. Outgoing messages are transmitted over the signalling links.

Service switching points (SSPs) are switches equipped to halt call progress, launch an SS7 query to obtain additional routing of information from an SCP, and then route or treat the call based on the information received in the SCP's response. SSPs interact with databases to provide services and routing.

Service control points (SCP) are often referred to as SS7 services databases. One or more SCPs can serve as a central intelligence point in the network for determining how and if calls are to be routed through the network. Queries and responses to and from the SCP are carried over SS7 signalling links in the form of packet messages.

Signal transfer points (STP), are special SS7 nodes which provide a message switching function between other nodes and a SS7 network. Acting as a packet switch, it examines incoming messages and then routes them over the appropriate signalling link to the proper destination switching offices and databases. In this particular function, it supports end-to-end signalling, i.e. in transit (local, tandem and toll) connections, required for transaction messaging used for special services. Unlike other SS7 nodes, the STP does not generally act as a source or sink for SS7 messages.

Figure 1:
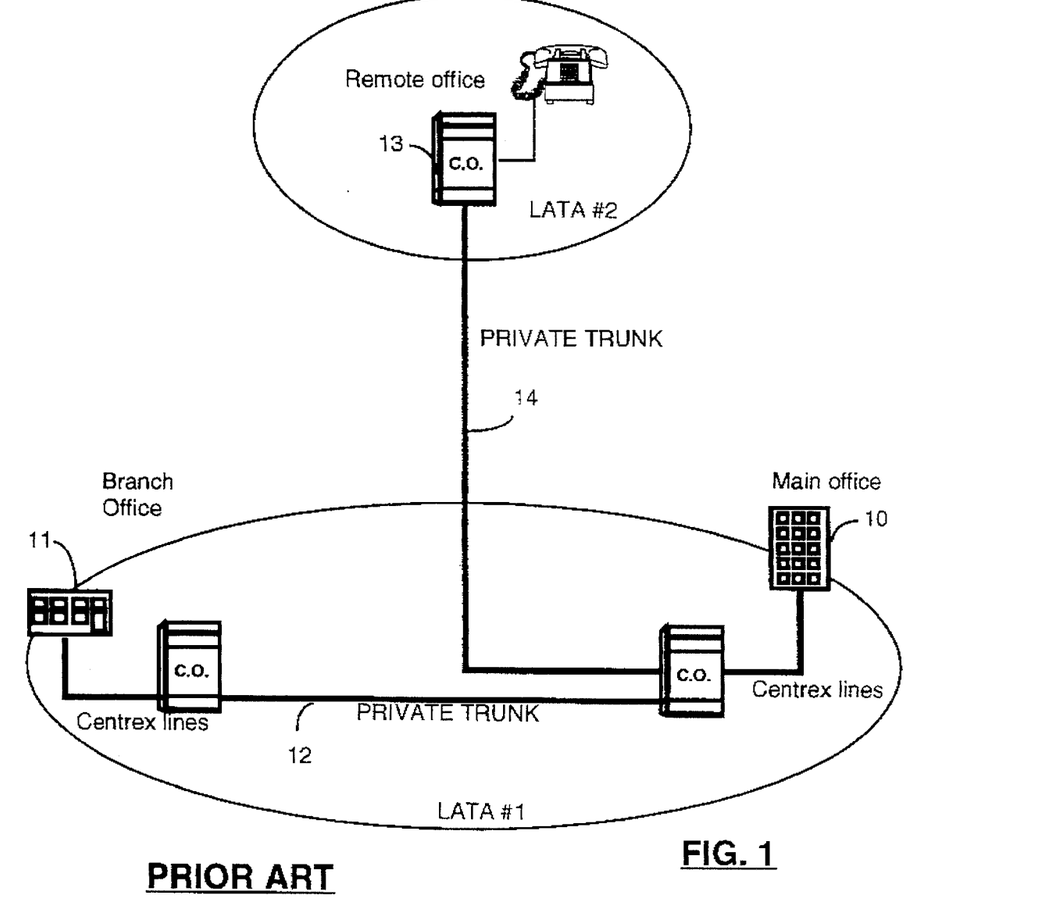
FIG. 1 is a diagram illustrating a telephone network for offering centrex services as used in the prior art.

Referring now to FIG. 1, we have shown a typical telephone network which can be used for providing centrex services to a customer having multiple or multi-location offices, one or more of which can be located in another local access transport area (LATA). As indicated earlier, a LATA is a fixed non-overlapping geographic area which is operated by a Bell operating company. Although local and toll calls within a LATA can be provided by the same Bell operating company, a remote office located in a separate LATA may have to be served by an inter-exchange carrier.

In the past, customers having separate offices such as shown in FIG. 1, wherein a main office 10 and a branch office 11 located in LATA No. 1 were provided with a private trunk 12 in order to offer centrex services between each office. Similarly, in order to provide centrex services to the remote office 13 located in LATA No. 2, an additional private trunk 14 was required to maintain the same level of centrex services across each office.

Unfortunately, this type of telephone network facility was only available to large corporations, federal and state governments since the cost of providing private trunks was quite high.

The introduction of multi-switch business group services enabled service operators to offer centrex and private network traffic to a wide range of customers at a reduced cost since traffic between offices is placed on public CCS7 facilities. When an MBG call is routed over a public CCS7 trunk, the identity of the customer group is sent to the destination switch. This allows a switch to identify calls among members of the same customer group and handle them differently than other calls. As indicated earlier, MBG extends many centrex services across the CCS7 network, supporting features such as network name and number display, reason display for call pick-up, call transfer, conferencing, and call forwarding.

Figure 2:
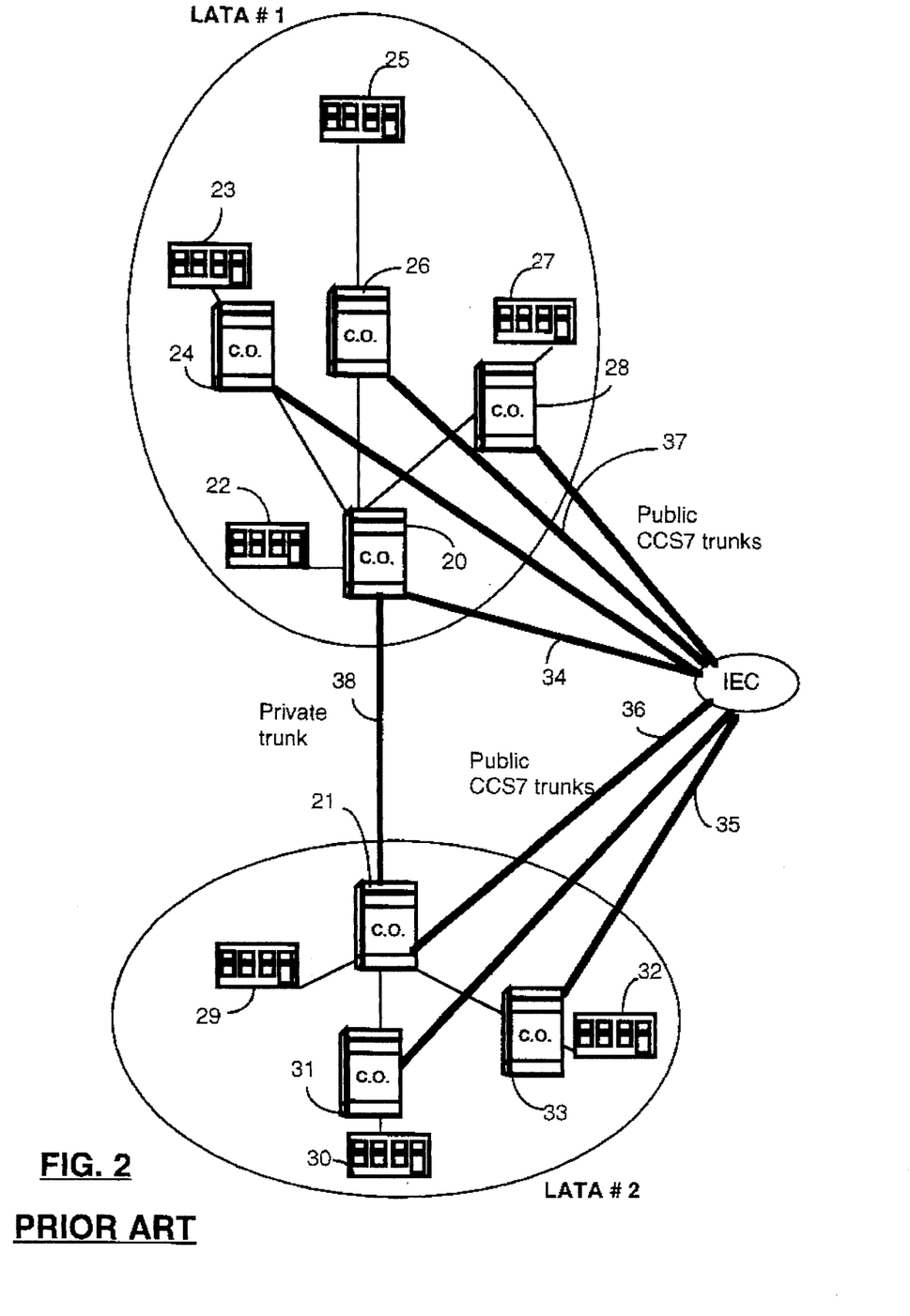
FIG. 2 is a block diagram of a network for offering multi-switch business group services for inter- and intra-LATA calls as used in the prior art.

In the prior art example of FIG. 2, a customer is provided with a number of offices located within two separate LATAs. For the purpose of this example, each of the separate offices is served by a separate central office. Even though a Bell operating company can provide a multi-switch business group service to a customer having offices in each LATA, MBG services across LATA boundaries cannot currently be offered. If the customer requires centrex-type services between offices located in LATA No. 1 and LATA No. 2, then private or dedicated trunks have to be used between LATAs. In each LATA, a central office hub is provided to enable call routing between LATAs. In FIG. 2, central office 20 is used as a hub site for customer locations in LATA No. 1 and central office 21 is provided as a hub site for customer locations in LATA No. 2. In this example, the customer has four branch offices in LATA No. 1 and three branch offices in LATA No. 2. Branch office 22 receives MBG services via central office 20, branch office 23 receives MBG services via central office 24, branch office 25 receives MBG services via central office 26 and branch office 27 receives MBG services via central office 28.

In LATA No. 2, branch office 29 receives MBG services via central office 21, whereas branch office 30 receives MBG services via central office 31 and branch office 32 receives MBG services via central office 33.

If the customer asks for MBG services across all locations, then a private trunk 38 selected from public CCS7 trunks is used to provide MBG services between LATA No. 1 and LATA No. 2.

Because of the high costs associated with the use of private or dedicated trunks, the deployment of MBG services to customers having locations in separate LATAs, has not been attractive to smaller size customers.

When a call is generated from an office in LATA No. 1 to an office in LATA No. 2 and the customer has a private trunk, such as trunk 38, then the call is routed via central office hub 20 on trunk 38 to central office hub 21 for routing to the requested office. If branch office 25 places a call to branch office 32 using the centrex-type abbreviated dialing, then the call is routed via central office 26 to central office hub 20 to central office hub 21 via trunk 38 and on to central office 33 for connection to branch office 32.

However, if no private or dedicated trunk is available, then the call is routed via an inter-exchange carrier. If branch office 25 places a centrex-type call to branch office 32, the call is routed to central office 26 and to central office hub 20. However, at that point, an inter-exchange call is made over public CCS7 trunk 34 which will route the call via trunk 35 to central office 33 serving branch office 32. Similarly, if branch office 32 makes a call to branch office 25, the call will be routed through central office 33, hub 21, CCS7 public trunk 36 and CCS7 public trunk 37 connected to central office 26 serving branch office 25. The inter-exchange carrier routes the call to the end office in that fashion since it makes use of the called party's NPA-NXX number to select which one of the central offices serving the branch office should receive the call.

Figure 3A:
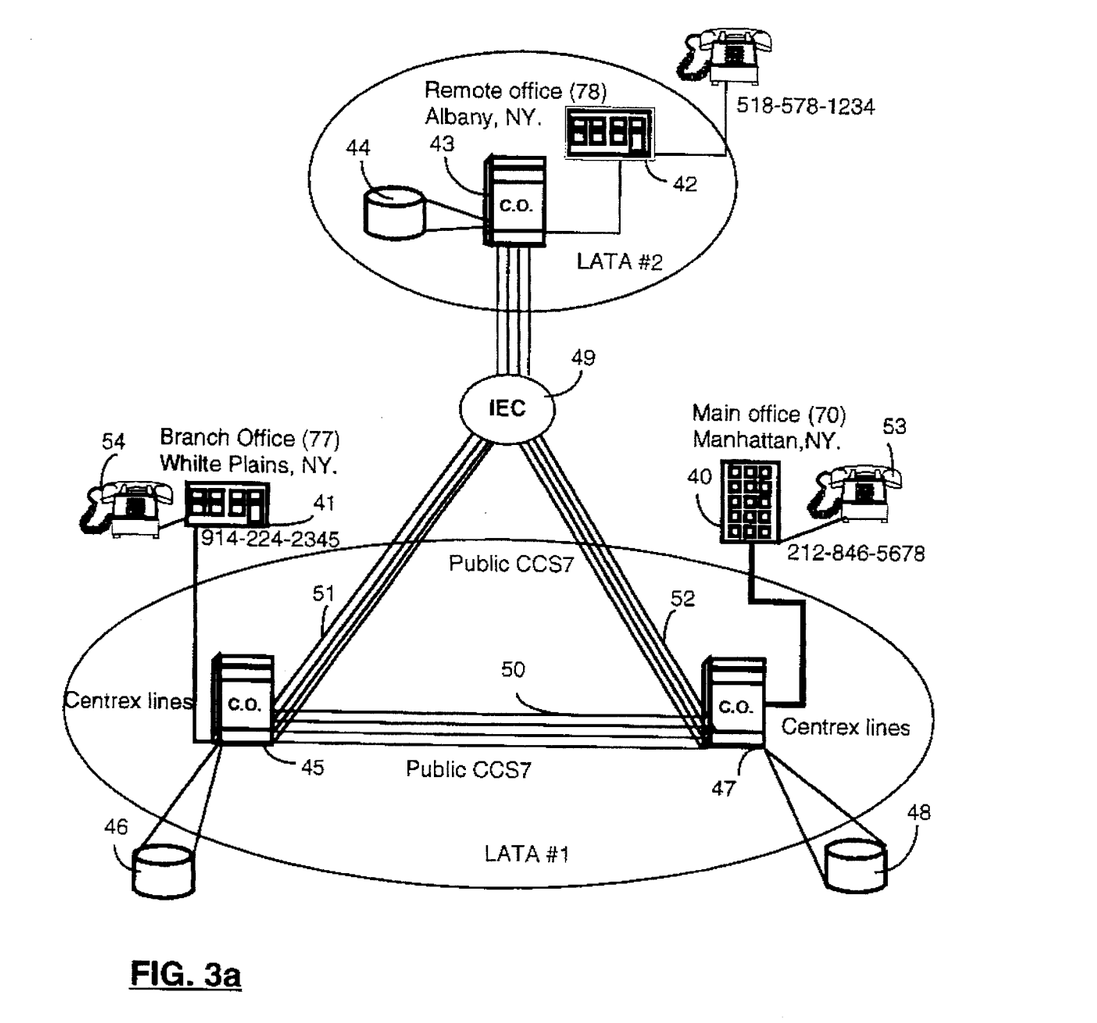
FIG. 3a is a diagram illustrating a telephone network making use of the present invention in a multi-switch business group service environment.

With reference to FIG. 3a, we have shown a diagram illustrating a telephone network for providing a multi-switch business group service wherein MBG services are provided across separate LATAs. In this example, a customer has a main office in Manhattan, N.Y., a branch office in White Plains, N.Y., and a remote office in Albany, N.Y. The Manhattan and White Plains offices are both located within LATA No. 1, whereas the remote office located in Albany, N.Y. is within LATA No. 2. It should be noted that although the Manhattan office and the White Plains office are both located within the same LATA, toll charges may apply for standard PSTN calls from Manhattan to White Plains. In this example, the customer's offices located in New York State are provided with the 7-series multi-switch business group identifiers or access codes. These access codes are used to tell the network how to route the call. If the customer has offices outside of New York State, it may be provided with a different access code. Thus, in this example, the main office 40 is assigned access code 70, the White Plains branch office 41 is assigned the access code 77 and the Albany remote office 42 is assigned the access code 78. All three locations will have the same MBGid, "National 1234". In order to provide the MBG service, each central office associated with a customer location, is provided with the customer profile to identify or associate that customer with the MBG service. Thus, central office 43 providing access to customer location 42 in LATA No. 2 is provided with a database 44 for storing the customer profile. Similarly, central office 45 is provided with a similar database profile 46 for use by the customer's branch office 41. Central office 47 serving main office 40 makes use of database 48 for storing the customer profile. This MBG network architecture is commonly referred to as a switch-based MBG architecture. If the telephone network is capable of providing advance intelligent network (AIN) features, then a centralized database, such as a Service Control Point (SCP) can be provided for storing the customer's MBG information.

Figure 3B:
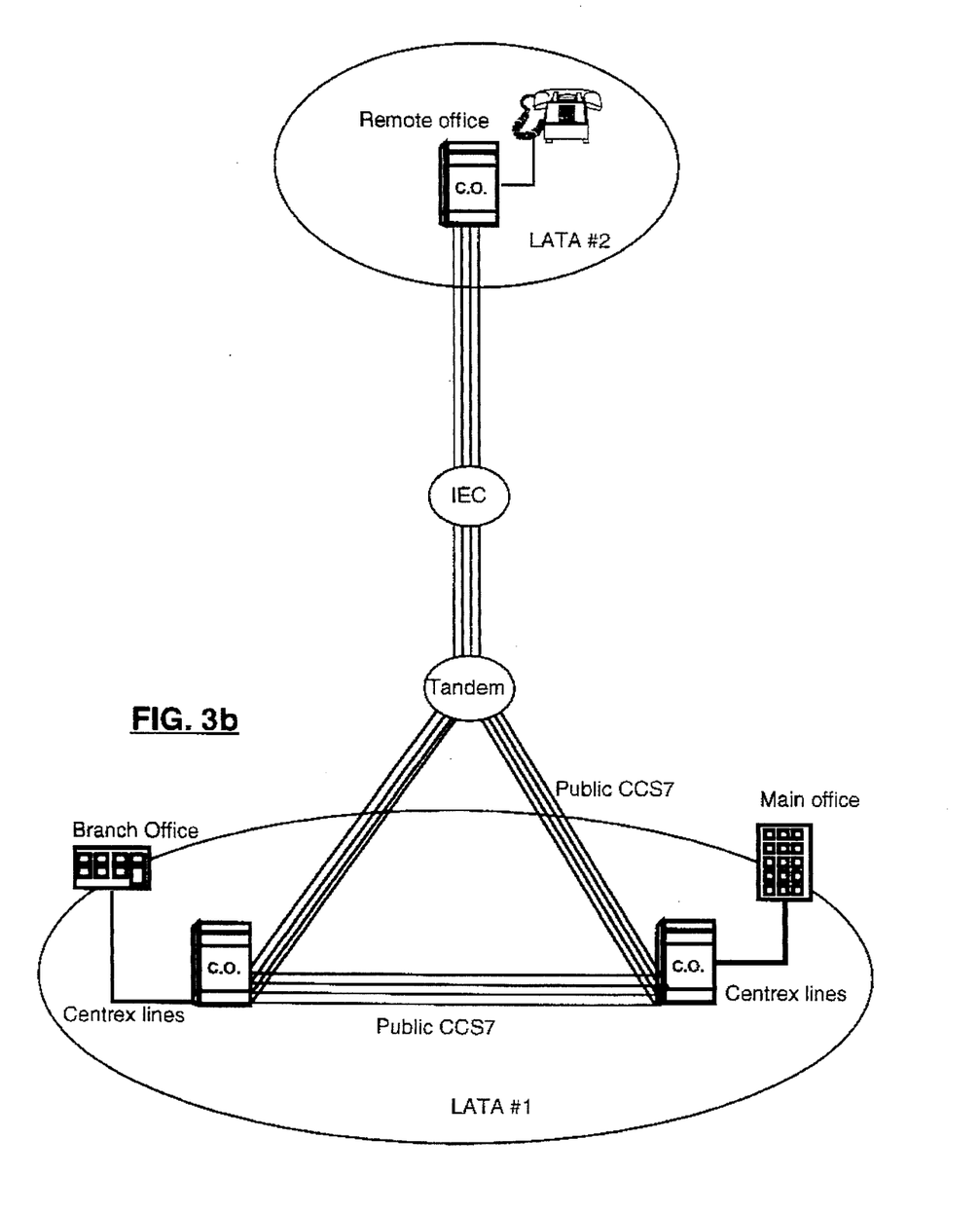
FIG. 3b is a diagram illustrating a telephone network according to another embodiment of the present invention.

Central offices 43, 45 and 47 are each interconnected by means of public CCS7 trunks. Calls from central office 45 or central office 47 directed to central office 43 are routed via an inter-exchange carrier 49 since these are inter-LATA calls. Signalling information on public CCS7 trunks 50, 51 and 52 is carried by means of integrated services digital network user part (ISUP) messages. The embodiment of FIG. 3b is similar to the network of FIG. 3a, except that a tandem switch is used to route calls from a LATA's central offices to an IEC.

For intra-LATA calls, inter-office signalling messages, such as ISUP, contain an Initial Address Message (IAM) which is recommended to follow Bellcore's GR-317 IAM protocol. This message contains a message type, nature of connection indicator, forward call indicators, calling party's category, user service information, called party number, calling party number and hop counter parameters. Inter-LATA calls make use of an IAM which follows Bellcore's GR-394 protocol. This protocol includes all of the above parameters plus a charge number, originating line information, transit network selection, carrier selection, service code and carrier identification code parameters.

In order to enable MBG services to be carried inter-LATA, the IAM inter-LATA protocol is modified such that the Business group (BG), generic address (GAP) and traffic network selector (TNS) parameters are also carried in ISUP initial address messages over the SS7 signalling link. Calls routed via an inter-exchange carrier make use of a transit network selector parameter in order to support equal access service. This TNS parameter is inserted in the initial address message of a toll call.

Figure 4:
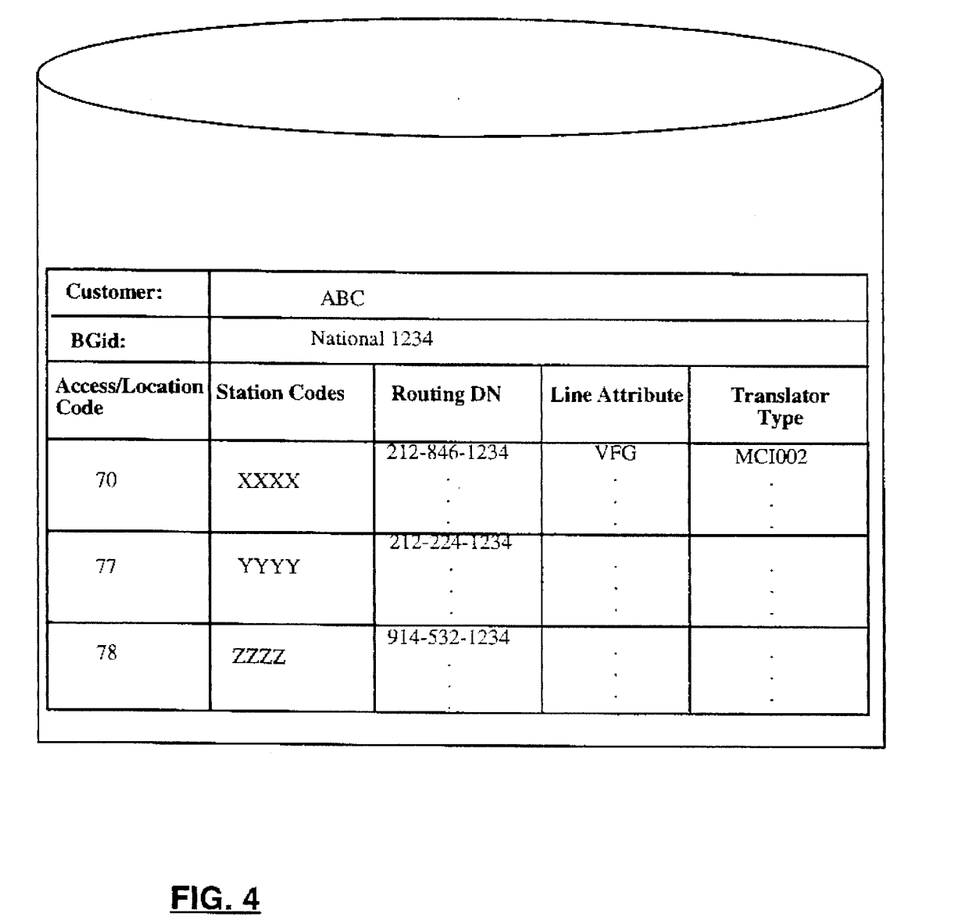
FIG. 4 is a diagram illustrating database tables used in routing calls under the method of the present invention.

An example of the database information stored at each switch, which enables this service is shown in FIG. 4. The customer profile identifies or associates a customer with an MBG identifier associated with each customer location. In this example, the customer's New York State offices are all identified by the 7-series identifier. The main office in Manhattan has identifier 70, the White Plains office is provided with identifier 77, whereas the Albany office is provided with identifier 78. For each identifier, the database provides a listing of station addresses provided at the customer's premises. This information enables the customer subscribing to MBG services to make use of centrex-type services between each office. For example, if an abbreviated centrex-type call is generated from station 53 of the Manhattan office to station 54 of the White Plains office, a query to database 48 will be initiated in order to properly route the call. That is, if a user at station 53 wants to reach the user of station 54 using abbreviated dialing, the calling party at station 53 would dial 77 plus the four-digit extension of station 54. The four-digit extension may be but is not necessarily the same as the last four digits of the physical address of station 54. Assuming that it is, then calling party at station 53 would dial 77 plus 2345 to reach the called party located at station 54. When the call is received at station 54, the called party would be able to see the calling party's number and/or name if those features are supported by the telephone hardware and subscribed to by the MBG service customer.

In order to have a better understanding of how the call is routed, a call scenario is described with reference to FIGS. 3a, 4, 5a, 5b and 5c. The call scenario makes use of the database tables of FIG. 4, which would be provided by database 48 of central office switch 47.

Upon lifting the receiver, station 53 requests from central office 47 a dial tone. Central office 47 identifies the request as originating from a centrex line. This is shown at decision box 60 of FIG. 5a. Once the dial tone is received by the calling party, the calling party has the option of dialing 0 for the switchboard, 9 for a standard PSTN line, or an access code to indicate that the call is directed to another office location having a centrex-type service. The access code is then followed by any digit allocated to this customer for MBG-type services. In this example, the customer has been allocated the 7-series of digits for New York State offices. Therefore, when the first digit is dialed, i.e. 7, the central office 47 interprets this first digit as a request by the calling party to make an abbreviated centrex-type call to another Business Group Location (BGLOCN). If only a 4 digit extension is dialed, then the call is directed to another station within the same BGLOCN. If an access code is entered, central office 47 can then expect five additional digits to be entered by the calling party at station 53. Those last five digits will identify and enable the central office 47 to locate the called party's physical address from database 48 in order to route the call appropriately. In this example, the last five digits are 7-2345. Once these digits are received at central office 47, a database query is made to database or routing table 48 in order to find whether the call will be intra or inter-LATA. The routing tables will also provide routing information to locate the appropriate physical station address.

Figure 5A:
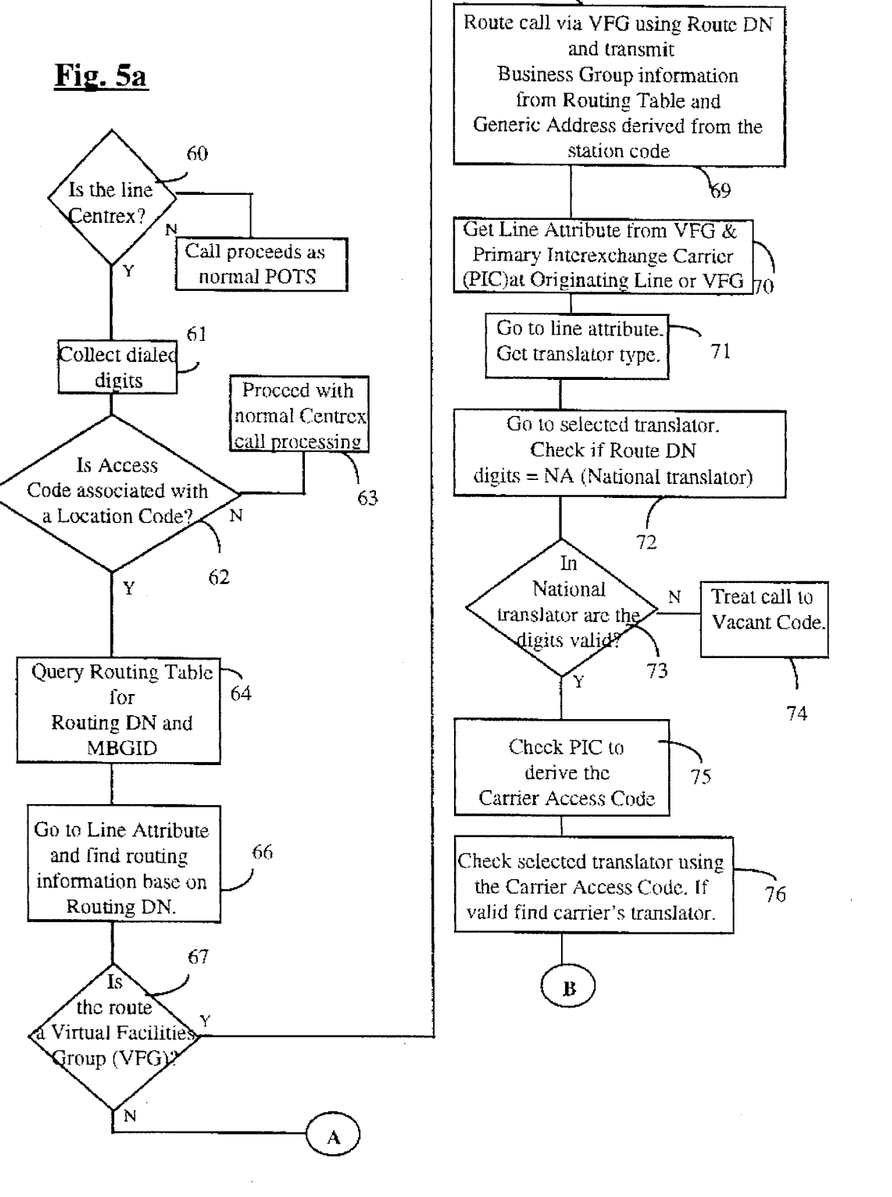
FIGS. 5a, 5b and 5c are flow diagrams illustrating how an MBG serviced call is routed over a IEC.

Once the dialed digits have been collected (box 61 of FIG. 5a) at the central office 47, a check is made on whether the access code, i.e. 77 dialed by the calling party, points to a business group location number (BGLOCN). This is illustrated in FIG. 5a at decision box 62. If no, the call proceeds at box 63 as a normal centrex call processing. If yes, then routing table 48 shown in FIG. 4 is queried at box 64 in order to find a routing DN and BGID associated therewith. Then, at box 65, a correlation is made between the line attribute and the route directory number to find routing information. Then, at decision box 66, a determination can then be made on whether the routing information points to a virtual facilities group (VFG).

Figure 5B:
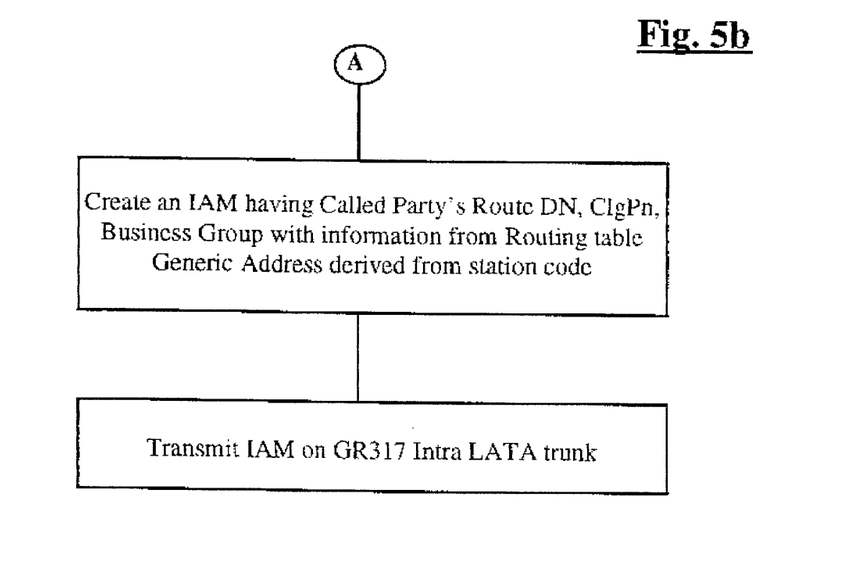

If no virtual facilities group has been identified, then the call proceeds to box 67 of the flow diagram shown in FIG. 5b, wherein an initial address message (IAM) is formed. This IAM contains a route directory number, calling party number, business group information from a business group data table and a generic address derived from the station digits. The station digits may or may not contain the access code. At box 68, the IAM is sent on an intra-LATA trunk under protocol GR317 to the called party and more particularly to the terminating switch serving the called party.

However, at box 67, if the routing information indicates that the call is to be routed via a virtual facilities group, then the call is routed through the virtual facilities group using the routing DN.

Virtual facilities group provides a mechanism to eliminate loop around trunks. Loop around trunks are used in certain switching offices to implement integrated business networks (IBN) inward wide area telephone service (INWATS) and outward wide area telephone service (OUTWATS) and to provide equal access capabilities.

The virtual facilities group (VFG) is provided to simulate finite resources, such as lines or trunks in software. When a facility group is accessed, the switch checks if there are any virtual facilities available. Thus, at box 69, the call is routed through this virtual facilities group with the route DN. Business group information from a business group data table is also sent along with the generic address which includes the dialed digits. The line attribute can then be obtained from the virtual facilities group and the primary inter-exchange carrier (PIC) at the originating line or virtual facilities group.

With the line attribute, the translator type can then be obtained at box 71. Using the selected translator, a check is made at box 72 to determine whether the route DN digits are equivalent to national translator. Then, at decision box 73, a decision is made to determine whether the national translator contains valid digits. If no, the call is treated to a vacant code at box 74. If the decision made at box 72 is yes, then the PIC is checked to derive the carrier access code at box 75. Then, at box 76 a check of the selected translator is done using the carrier access code. If the selected translator is valid, the carrier's translator is determined.

Figure 5C:
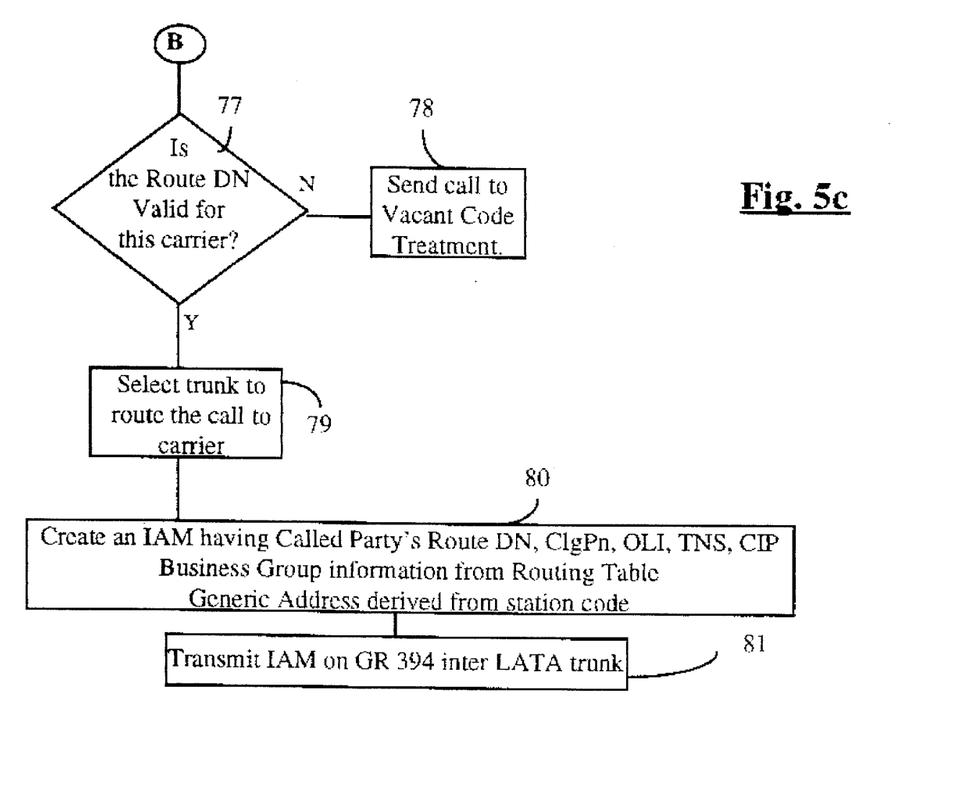

The call flow then proceeds at FIG. 5c to decision box 77, wherein a check is made to determine whether the route DN for this carrier is valid. If the route DN is not valid, then the call is sent to a vacant code treatment at box 78. However, if the call is valid, then a trunk is selected to route the call out of the office to the carrier at box 79. At box 80, an initial address message (IAM) is created in order to route the call to the carrier. The IAM to the called party will contain the route DN, calling party number, OLI, TNS, CIP, business group information from a business group data table, and the generic address having the dialed digits which may not necessarily contain the access code originally dialed by the calling party. The IAM can then be transmitted at box 81 on an inter-LATA trunk using the GR394 protocol.

In this example, the physical address will be 914-224-2345. With this information, central office 47 can formulate an ISUP IAM message containing the necessary BG, GAP and TNS parameters to complete the call. A public CCS7 trunk 50 is then selected according to the identified NPA and NXX.

Although the present invention has been explained hereinabove by way of preferred embodiments thereof, it should be pointed out that any modifications to these preferred embodiments within the scope of the appended claims, are not deemed to change or alter the nature and scope of the present invention.

We claim:

1. In a telephone network having a plurality of locations served by switching offices with access to public CCS7 signalling facilities, a method of providing multi-switch business group (MBG) services at each of said plurality of locations, such that MBG services can be provided for calls made from a calling party served by an originating switch at one location to a called party served by a terminating switch at a location serviced by an inter-exchange carrier (IEC), comprising the steps of:
   a) determining, when said calling party goes off-hook, whether the call is made from a centrex line;
   b) collecting at said originating switch, digits dialed by said calling party;
   c) determining whether the dialed digits contain an access code indicative that the call is to be routed to one of said plurality of locations served by an IEC; and
   d) if the call is to be routed via an IEC, modifying an initial address message (IAM) required for IEC calls, to include MBG service information, such that MBG services can be offered between the calling party and the called party over public CCS7 trunks routed via an IEC.

2. A method as defined in claim 1, wherein said access code is determined to be indicative of a call directed to one of said plurality of locations served by an IEC, by determining if the access code is associated with a Business Group Location (BGLOCN).

3. A method as defined in claim 2, further comprising the step of obtaining a routing Directory Number and Business Group IDentification from a routing table if said access code is associated with a BGLOCN.

4. A method as defined in claim 3, wherein a line attribute and routing information is used to obtain routing information from said routing table.

5. A method as defined in claim 4, further comprising the step of creating an intra-LATA IAM for routing the call, if said routing information does not point to a Virtual Facilities Group.

6. A method as defined in claim 4, further comprising the step of routing said call via a VFG using said routing DN, if said routing information points to a VFG.

7. A method as defined in claim 6, further comprising the step of obtaining a line attribute associated with the call from the VFG and a primary interexchange carrier (PIC) code at an originating line or said VFG.

8. A method as defined in claim 7, further comprising the step of selecting from the line attribute the type of carrier translator required for this call.

9. A method as defined in claim 8, further comprising the step of obtaining from said selected translator, a national translator associated with the route DN.

10. A method as defined in claim 9, wherein if the digits of the route DN are not validated by said national translator, said call is treated to a vacant code.

11. A method as defined in claim 9, further comprising the step of determining a carrier access code associated with said PIC, if said digits are validated at said national translator.

12. A method as defined in claim 11, wherein a carrier's translator is determined by correlating the carrier access code with the selected translator.

13. A method as defined in claim 12, wherein a trunk to the carrier is selected if the routing DN is determined to be valid for this carrier.

14. A method as defined in claim 13, further comprising the step of forming an inter-LATA IAM containing routing information to enable the call to be routed to the calling party.

15. A method as defined in claim 14, wherein said routing information comprises the called party route DN, calling party number, the originating line information, the transit network selector, carrier identification parameter, business group information and generic address derived from the station address.

* * * * *